United States Patent [19]

Oates

[11] Patent Number: 4,714,233
[45] Date of Patent: Dec. 22, 1987

[54] ADAPTER BRACKET FOR MAKING A VALVE FIRE SAFE

[75] Inventor: Danny R. Oates, Lake Charles, La.

[73] Assignee: Conoco Inc., Ponca City, Okla.

[21] Appl. No.: 5,533

[22] Filed: Jan. 20, 1987

[51] Int. Cl.$^4$ .............................................. F16K 31/00
[52] U.S. Cl. ........................................ 251/14; 137/72;
137/75; 137/79; 251/90; 251/93; 251/291
[58] Field of Search ............... 137/72, 75, 79; 251/14, 251/90, 93, 291

[56] References Cited

U.S. PATENT DOCUMENTS

| 3,835,736 | 9/1974 | Campbell | 251/93 X |
| 3,842,853 | 10/1974 | Kelly | 137/75 |
| 3,958,592 | 5/1976 | Wells | 251/291 X |
| 4,383,548 | 5/1983 | Durenec | 251/291 X |

*Primary Examiner*—Harold W. Weakley
*Attorney, Agent, or Firm*—Richard K. Thomson

[57] ABSTRACT

An adapter bracket that can be attached to the exterior of a conventional gate valve and valve actuator converting the valve to a fire safety valve. The bracket can be clamped to the exterior of the valve/actuator housing without modification to the existing structure. The bracket includes an adapter plate with an externally threaded cylindrical extension. A hole through the adapter plate is coaxial with the aperture through the cylindrical extension to non-engagingly permit the valve actuator rod to pass therethrough. The threaded extension receives a standard lock-open cap to hold the valve in the open position to avoid severing of the cable in wireline operations due to a power outage, for example. The cap includes a portion made of fusible material which, in the event of fire, will melt permitting the valve to close under operation of a biasing spring.

5 Claims, 4 Drawing Figures

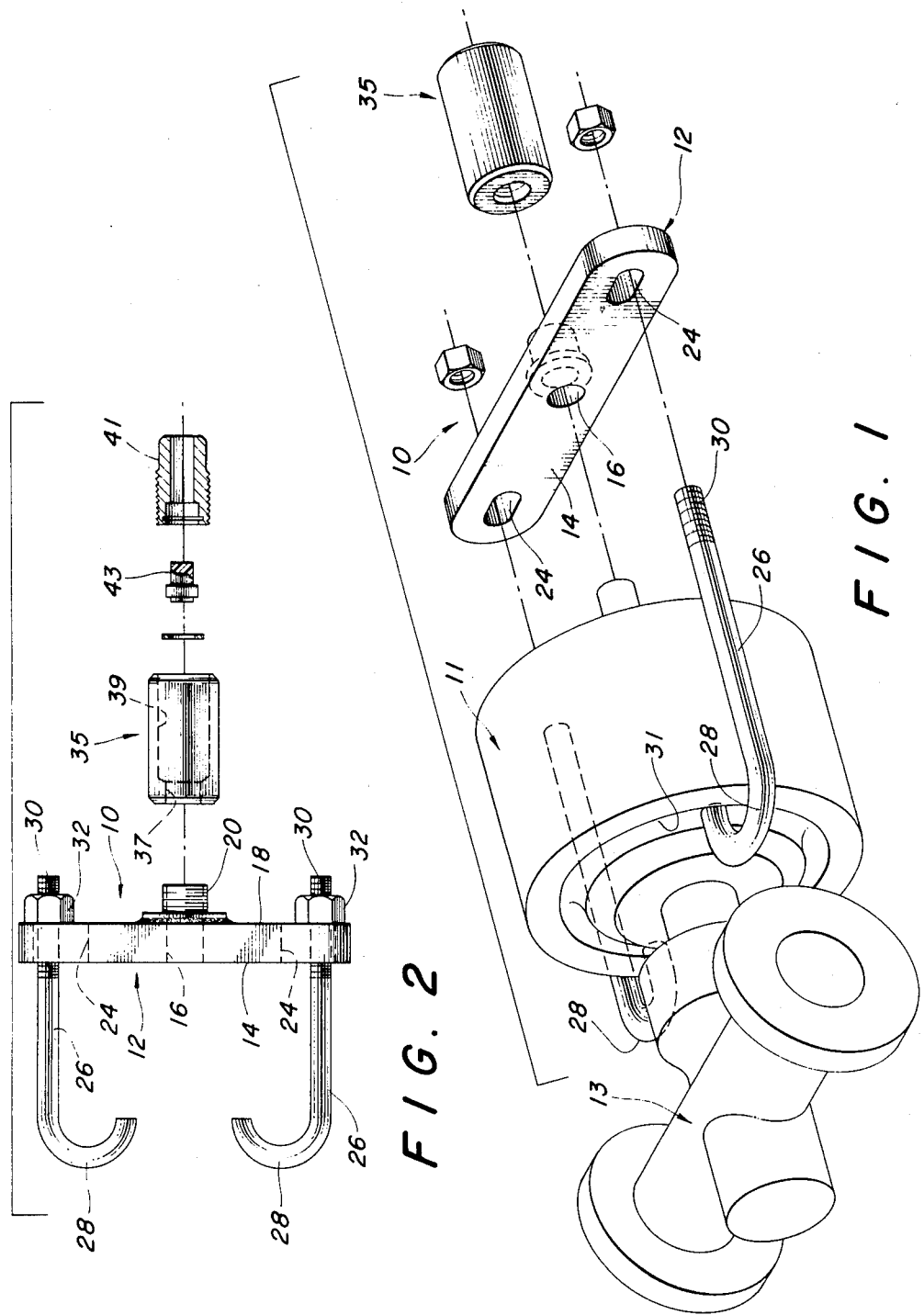

ADAPTER BRACKET FOR MAKING A VALVE FIRE SAFE

BACKGROUND AND SUMMARY OF THE INVENTION

The present invention is directed to an adapter bracket that can be connected to an existing conventional gate valve to convert it to a fire safety valve, for wireline operations and the like.

A wellhead tree on an offshore platform is equipped with a gate valve in which the piston-like valve actuator biases the valve to the closed position by means of a spring acting against the lower surface of the actuator piston head. Pneumatic pressure engages the opposite or upper surface of the piston to overcome the biasing spring and hold the valve in the open position. In the event of a well fire, power to the compressor is cut off and the biasing spring automatically shuts the valve curtailing the flow of well fluids thereby preventing an uncontrolled continuous flow of fuel to the fire.

On an offshore platform, temporary "blips" in power (momentary blackouts) are not uncommon. Such a blip shutting down the compressor and automatically closing the gate valve can, at times, be more than a nuisance. One such time, is during the performance of routine maintenance or well testing using conventional wireline techniques. A temporary power outage closing the gate valve severs the wireline, dropping the tool being employed, along with several thousand feet of wireline, downhole. In addition to the damage to the tool, additional expense will be incurred in fishing the wireline and tool out of the wellbore resulting in both the cost associated with the manhours of labor and that resulting from the hours of lost well production mounting as the clock runs.

In order to avoid such expensive fishing expeditions, it was not an uncommon practice to mechanically disable the biasing spring (i.e., to jam the actuator open) during wireline operations to guard against the possibility of a temporary power outage. Such a practice is obviously unsafe and represents a significant gamble that a fire will not occur during the time when the valve is jammed open.

In response to customer reaction to this problem, valve manufacturers began manufacturing a "fire safety valve" that enabled the valve to be held open by a cap over the end of the actuator rod. This cap had a portion made of fusible plastic material which, in the event of a fire, melted allowing the valve to close. While these modified valves solve the problem for future installations, the problem of the existing in-place conventional gate valves remains. The prospects of replacing the in-place valves with the more expensive fire safety valves, particularly for large producers with a significant number of wellheads, are not good, particularly in today's economy. A less expensive means of safely preventing wireline cutting is needed.

The present invention satisfactorily fills this need. An adapter plate which has an externally threaded cylinder projecting from one side thereof is externally clamped to the actuator housing for a conventional gate valve. This adapter permits the conventional gate valve to be converted to a fire safety valve by the attachment of the identical fusible cap that is utilized in conjunction with the recently developed fire safety valves. The adapter of the present invention does not require any modification to be made to the existing valve actuator but can be clamped onto the outside of the existing actuator and, if desired, can be shifted from wellhead to wellhead as each receives a wireline workover, log test, etc., as required. Further, tests have shown that the adapter bracket can withstand extended periods of exposure to pressures as high as 10,000 psi without failing.

Other features, advantages and characteristics of the present invention will become apparent after a reading of the following detailed description of the invention.

BRIEF DESCRIPTION OF THE DRAWINGS

FIG. 1 is an exploded isometric view of the adapter of the present invention with the valve and valve actuator assembly with which it is used;

FIG. 2 is a side view of the assembled adapter bracket;

DETAILED DESCRIPTION OF THE PREFERRED EMBODIMENTS(s)

Figure 4:
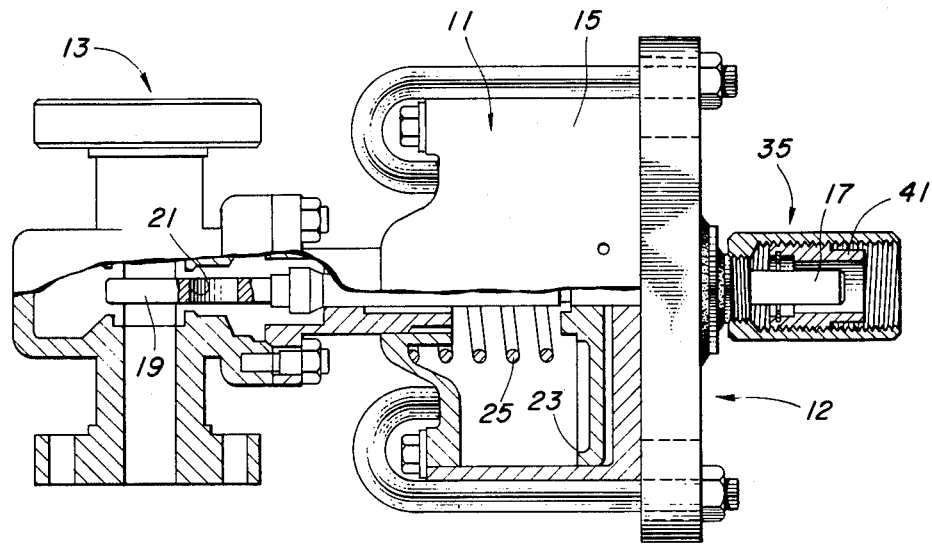
FIG. 4 is a side view in partial section similar to FIG. 3 with the fusible portion of the cap melted away enabling the valve to move to its closed position.

The adapter bracket of the present invention is shown in FIGS. 1 and 2 generally at 10. Bracket 10 comprises adapter plate 12 that is generally flat on first side 14 and has an aperture 16 extending through the center thereof. An externally threaded cylindrical extension 20 projects from the second side 18, its inner diameter being equal to and forming an extension of aperture 16. There is an oval aperture 24 formed in each end of plate 12. Rods 26 have hooks 28 formed on a first end and are threaded as at 30 on the other end to receive securement nuts 32.

Figure 3:
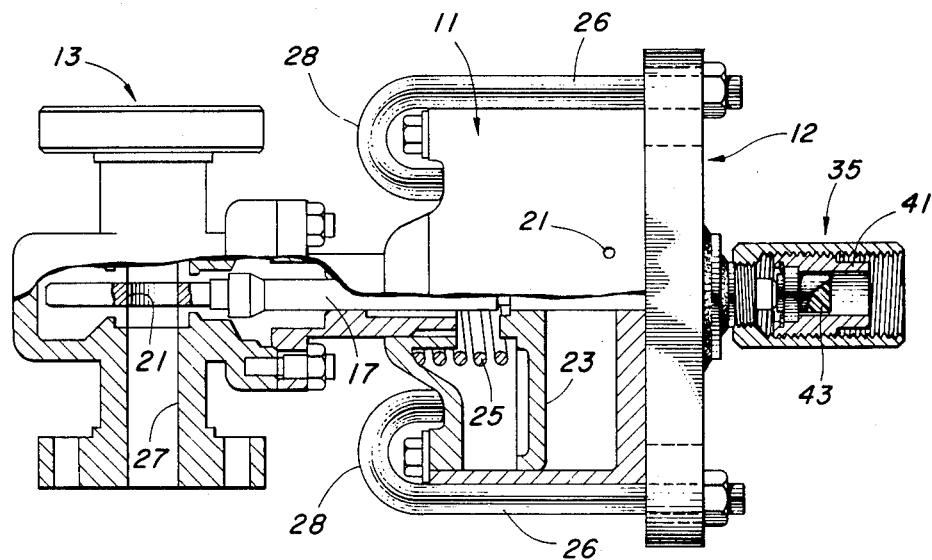
FIG. 3 is a side view in partial section of the valve and valve actuator with the adapter assembled thereto and the cap engaging the end of the actuator rod, thereby holding the valve in its open position.

As best seen in FIGS. 3 and 4, adapter bracket 10 is designed to be used on a valve actuator 11 that operates a conventional gate valve 13. The particular actuator depicted in the drawing is an Axelson AM actuator manufactured by Axelson, Inc., a subsidiary of U.S. Industries, Inc. However, the adapter bracket of the present invention may be used with other valve actuators, as well.

Actuator 11 comprises a housing 15 with actuator rod 17 partially contained therein and partially extending beyond one end thereof. Rod 17 is threadingly connected to gate valve 19 which has a flow port 21 formed near one end thereof. A piston 23 is secured to rod 17 near the opposite end and spring 25 engages one surface of piston 23 and biases rod 17 toward the right in FIGS. 3 and 4. This moves flow port 21 out of alignment with flow channel 27 formed in valve 13, i.e., spring 25 biases valve 13 to its closed position. Fluid pressure (generally pneumatic) is input through port 21 to overcome the bias of spring 25 to move flow port 21 into alignment with flow channel 27 and thus open the valve.

Hooks 28 of rods 26 engage in an annular groove 31 formed on the backside of actuator 11. Aperture 16 and cylindrical extension 20 receive the end of actuator rod 17 without contacting it (i.e., relative motion between rod 17 and plate 12 is permitted). Elongated openings 24 permit the position of the adapter plate 12 and hooks 28 to be adjusted slightly to accomodate the dimensional tolerances of the actuator 11. Securement nuts 32 solidly clamp the adapter bracket assembly 10 to the actuator housing 15.

The lock-open device or actuator rod-engaging cap is shown in FIGS. 3 and 4 generally at 35. By way of example, the device used in testing Applicant's adapter was Axelson's lock open cap bearing part No. 43114-0009. A first internally threaded portion 37 engages with the threads of cylindrical extension 20. A second internally threaded portion 39 threadingly receives rod-engaging plug 41. A portion 43 of plug 41 is made of a fusible material. Portion 43 is at least the diameter of actuator rod 17 and constitutes the only portion of the locking cap 35 that engages rod 17. Threaded portion 39 makes it possible to adjust the position of plug 41 to adjust for variations in length of actuator rods 17 or other such differences in valve/actuator assemblies. Should a platform fire occur, the fusible material of which plug 43 is comprised would melt, undergo significant contraction in addition to flowing, permitting biasing spring 25 to move valve 19 to its closed position.

In operation, adapter bracket 10 is clamped onto actuator 11 over the end of actuator rod 17. The attachment of the bracket 10 to actuator 11 requires no fastener that penetrates through the actuator housing nor does it require any other modification to the actuator.

Once the bracket 10 is in place, the valve actuator 13 can be pressurized to open valve 11. Then lock-open cap 35 can be threaded onto cylindrical extension 20 with the position of plug 41 being adjusted as required through trial and error to obtain proper engagement between the respective elements to lock open gate valve 13. With valve 13 safely locked open, wireline operations, or the like, can be performed without risk of wireline severing nor of a hazardous uncontained fire fueled by the well reservoir in the event of a platform fire.

The adapter bracket 10 of the present invention was placed in a test fixture in the configuration shown in FIG. 3. The pressure in valve 11 was raised incrementally by 1000 psi intervals to 10,000 psi. It was maintained at this pressure for 30 minutes, then reduced to 5000 psi and cycled between 5000 and 7500 psi at 5 minute intervals for 50 cycles. The pressure was maintain at 5000 psi overnight, then raised once again to 10,000 psi and maintained for 3½ hours. At no time during the test did the bracket show any signs of possible failure or leakage. This adapter appears capable of withstanding the rigors of platform utilization. Further, the ease with which it can be installed and removed permit it to be moved from wellhead to wellhead as wireline operations require, although the bracket itself is so inexpensive, labor costs associated with such moving may not be warranted.

Various changes, alternatives and modifications will become apparent following a reading of the foregoing specification. For example, although the use of Applicant's adapter has only been disclosed with wireline operations, it will be apparent that any number of other uses such as when snubbing, doing coiled tubing work, or the like, will be advantageous for the present invention. Accordingly, all such changes, alternatives and modifications as fall within the scope of the appended claims are considered part of the present invention.

I claim:

1. Apparatus for converting a conventional gate valve to a fire safety valve, wherein said gate valve includes a slide gate operated by an actuator which overcomes a biasing spring and maintains said valve in an open position by fluid pressure and an end of an actuator rod which projects beyond a first surface of an actuator housing, said apparatus comprising:
    an adapter plate, said plate having a first flat side, with a cylindrical extension protruding from a second opposite side of said adapter plate, said cylindrical extension having an inner diameter sufficiently large to non-engagingly receive said actuator rod, the outside of said cylindrical extension being threaded;
    means for securing said adapter plate to the exterior of said actuator housing with said first flat side toward said actuator housing;
    said cylindrical extension being adapted to be threadingly engaged by an actuator rod-engaging cap, at least a portion of said rod-engaging cap being made of fusible material, said fusible material portion of said cap engaging the end of said actuator rod;
    wherein said rod-engaging cap engages the end of said actuator or rod and holds said valve in its open position inspite of the loss of fluid pressure unless and until said fusible material is exposed to sufficient heat to melt it, whereby said fusible material will significantly contract enabling said valve to close under action of said biasing spring in the absence of fluid pressure.

2. The apparatus of claim 1 wherein said means for securing said adapter plate to said actuator housing comprises a clamping device that may be attached to said actuator housing without penetrating, or otherwise modifying, said housing.

3. The apparatus of claim 2 wherein said clamping device comprises a pair of hooked rods, a hooked portion of each said rod engaging a second surface of said actuator housing, said second surface lying generally opposite said first surface.

4. An adapter bracket for a gate valve which is situated in a well tree, or the like, said gate valve being held in the open position by fluid pressure against a force biasing it closed, said adapter permitting said valve to be safely maintained in an open position during wireline operations, or the like, such that the risk of said gate valve severing said wireline upon loss of fluid pressure to said gate valve is eliminated, said gate valve having an actuator, a housing which contains said actuator, a portion of an actuator rod extending beyond said housing, said adapter bracket comprising:
    an adapter plate which has a first flat side which engages said housing and a second opposing side with a protruding cylindrical extension, said cylindrical extension having an internal diameter sufficient to non-engagingly surround the portion of said actuator rod that extends beyond said housing, said cylindrical extension having an external thread adapted to be engaged by a cap member which has a fusible portion, said cap member engaging the end of said actuator rod holding said gate valve in an open position and preventing movement of said actuator rod and said gate valve unless and until said fusible portion is exposed to sufficient heat to melt it, whereby said actuator rod and gate valve are permitted to move to a second closed position under operation of said biasing force upon cessation of said fluid pressure, means for clamping said adapter plate to said actuator housing.

5. The adapter of claim 4 wherein said clamping means secures said adapter plate to said actuator housing in a manner requiring no modification of said existing housing.

* * * * *